(12) United States Patent
Heo et al.

(10) Patent No.: US 9,186,715 B2
(45) Date of Patent: Nov. 17, 2015

(54) MANDREL FOR BENDING RECTANGULAR DUCT BODY

(71) Applicants: BEIJING JINGUMCHANG AUTOMOBILE HITECH CO., LTD., Beijing (CN); GUMCHANG. CO., LTD., Yeongcheon-si, Gyeongsangbuk-do (KR); G.A TECH. CO., LTD., Asan-si, Chungcheongnam-do (KR)

(72) Inventors: Cheol Heo, Daegu (KR); Se Gil Shin, Daegu (KR)

(73) Assignees: BEIJING JINGUMCHANG AUTOMOBILE HITECH CO., LTD., Beijing (CN); GUMCHANG. CO., LTD., Gyeongsangbuk-Do (KR); G.A TECH. CO., LTD., Chungcheongnam-Do (KR)

( * ) Notice: Subject to any disclaimer, the term of this patent is extended or adjusted under 35 U.S.C. 154(b) by 0 days.

(21) Appl. No.: 14/156,854

(22) Filed: Jan. 16, 2014

(65) Prior Publication Data

US 2015/0196946 A1     Jul. 16, 2015

(51) Int. Cl.
*B21D 9/03* (2006.01)
*B21D 9/00* (2006.01)
*B23P 23/04* (2006.01)
*B21D 9/05* (2006.01)

(52) U.S. Cl.
CPC .. *B21D 9/00* (2013.01); *B21D 9/03* (2013.01); *B21D 9/05* (2013.01); *B23P 23/04* (2013.01)

(58) Field of Classification Search
CPC .............. B21D 9/00; B21D 9/03; B21D 9/05; B23P 23/04
USPC .............. 72/150, 154, 159, 335, 369, 370.27, 72/464, 466, 466.2, 478
See application file for complete search history.

(56) References Cited

U.S. PATENT DOCUMENTS

| | | | | |
|---|---|---|---|---|
| 4,744,233 A | * | 5/1988 | Trudell | 72/466 |
| 5,909,908 A | * | 6/1999 | Furuse | 72/466.2 |
| 7,171,835 B2 | * | 2/2007 | Nakazato | 72/150 |
| 7,578,160 B2 | * | 8/2009 | Caporusso | 72/466 |
| 2005/0268684 A1 | * | 12/2005 | Nakazato | 72/335 |

* cited by examiner

*Primary Examiner* — David B Jones
(74) *Attorney, Agent, or Firm* — IPLA P.A.; James E. Bame

(57) ABSTRACT

A mandrel for bending a rectangular duct body is provided. A round part and a shaft pin hole are formed at the front end of the mandrel, connection pieces and rollers are formed at the front end of the mandrel, protruded parts for supporting the bent part of the rectangular duct body and depressed parts in which depression parts will be formed are formed on both sides of the rollers, and oil grooves are formed in the sides of the rollers. Accordingly, there is an advantage in that workability and productivity can be improved because frictional force between the rollers and between the inside of the rectangular duct body and the rollers is reduced when performing a bending work because grease within the oil grooves formed in the rollers performs a lubrication action.

2 Claims, 7 Drawing Sheets

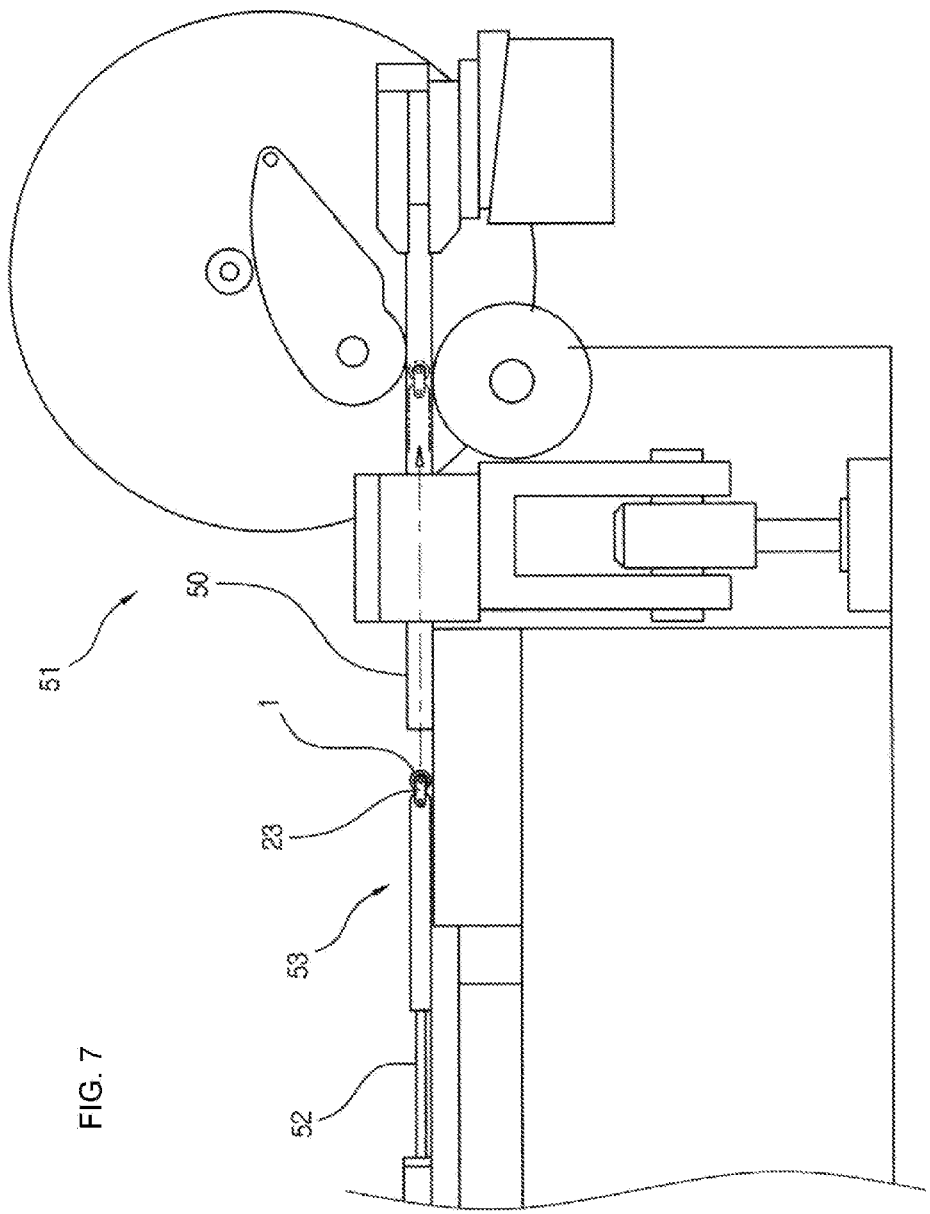

MANDREL FOR BENDING RECTANGULAR DUCT BODY

BACKGROUND OF THE INVENTION

1. Technical Field

The present invention relates to a mandrel for bending a rectangular duct body and, more particularly, to a mandrel for bending a rectangular duct body, wherein when a rectangular duct body used for various purposes, such as a hanger arm connected to the trunk lead of a vehicle is bent in a specific shape, the rectangular duct body is partially depressed so that a bent part is prevented from being cracked and rollers that form the mandrel are smoothly rotated.

2. Description of the Related Art

As noted, in a hanger arm connected to the trunk lead of a vehicle or parts that form various types of mechanical tools, a rectangular duct body is bent in a specific shape using a bending machine. When bending the rectangular duct body, the bending work is performed by inserting a mandrel into the rectangular duct body in order to prevent the bent part of the rectangular duct body from being depressed.

From among mandrels used to prevent a phenomenon in which a rectangular duct body is depressed when bending the rectangular duct body using a bending machine as described above, there is a mandrel having a main body formed of a rectangular pole and having a front end rounded. When performing a bending work on the rectangular duct body using such a mandrel, the round part of the mandrel needs to be precisely matched with the bent part of the rectangular duct body. However, an accurate position of the mandrel cannot be seen outside because the mandrel is inserted into the rectangular duct body.

Accordingly, there is a disadvantage in that the rectangular duct body is depressed in the direction in which the bent part of the rectangular duct body is bent because the bent part of the rectangular duct body cannot be precisely matched with the round part of the mandrel. Furthermore, there are many disadvantages in the structure of the mandrel, such as that a range in which the rectangular duct body is applied to the parts of various types of mechanical tools is narrowed, because the rectangular duct body cannot be bent at various angles.

In order to solve the disadvantages, a mandrel including one roller or two rollers and a mandrel having a metal plate stacked thereon have been disclosed, thereby solving some of the disadvantages of the mandrel. In such mandrels, however, a crack is generated in a bent part because the entire bent part is not depressed.

Furthermore, there are many problems in the structures of conventional mandrels, such as that the lifespan of the mandrel is short and a bending work is not smoothly performed, because a lubrication action is not smoothly performed between rollers that form the mandrel and between the roller and the rectangular duct body.

SUMMARY OF THE INVENTION

The present invention has been made keeping in mind the above problems occurring in the prior art, and an object of the present invention is to provide a mandrel for bending a rectangular duct body, which is configured to serve as a muscle and prevent a crack from occurring in a bent part by forming depression parts in the rectangular duct body at specific intervals and to enable a smooth bending work by reducing friction in each part, such as a roller and the rectangular duct body.

Another object of the present invention is to provide a mandrel for bending a rectangular duct body, which is configured to enable a smooth operation and maintain a long lifespan by providing the mandrel configured to have rollers smoothly rotated.

A mandrel for bending a rectangular duct body in accordance with the present invention includes a rectangular pole in which a round part and a shaft pin hole are formed at the front end of the rectangular pole and a female screw for rod connection is formed on the other side of the rectangular pole, two rollers formed at the edges of the connection pieces formed at the front end of the rectangular pole, and one roller formed at the center of the rectangular pole.

In particular, protruded parts for supporting the bent part of the rectangular duct body and depressed parts in which depression parts will be formed are formed on both sides of the rollers, and oil grooves are formed in the sides of the rollers.

BRIEF DESCRIPTION OF THE DRAWINGS

FIG. 7 is an exemplary diagram of a bending machine to which the mandrel accordance with the present invention has been applied.

DETAILED DESCRIPTION OF THE INVENTION

Figure 1:
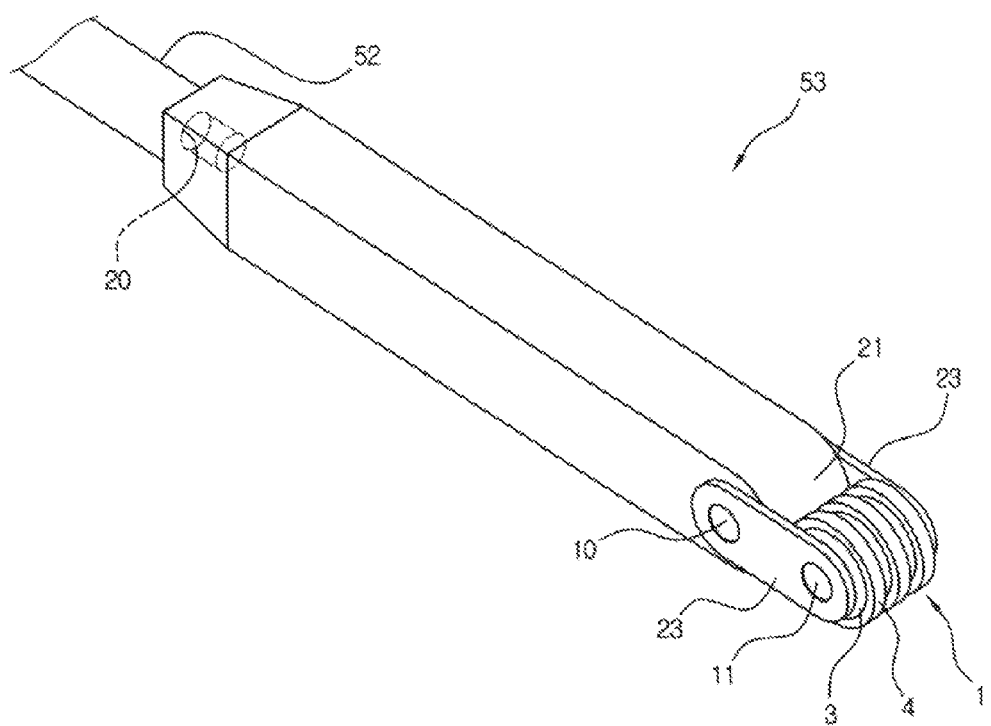
FIG. 1 is a perspective view showing a construction of a mandrel in accordance with the present invention.
Figure 2:
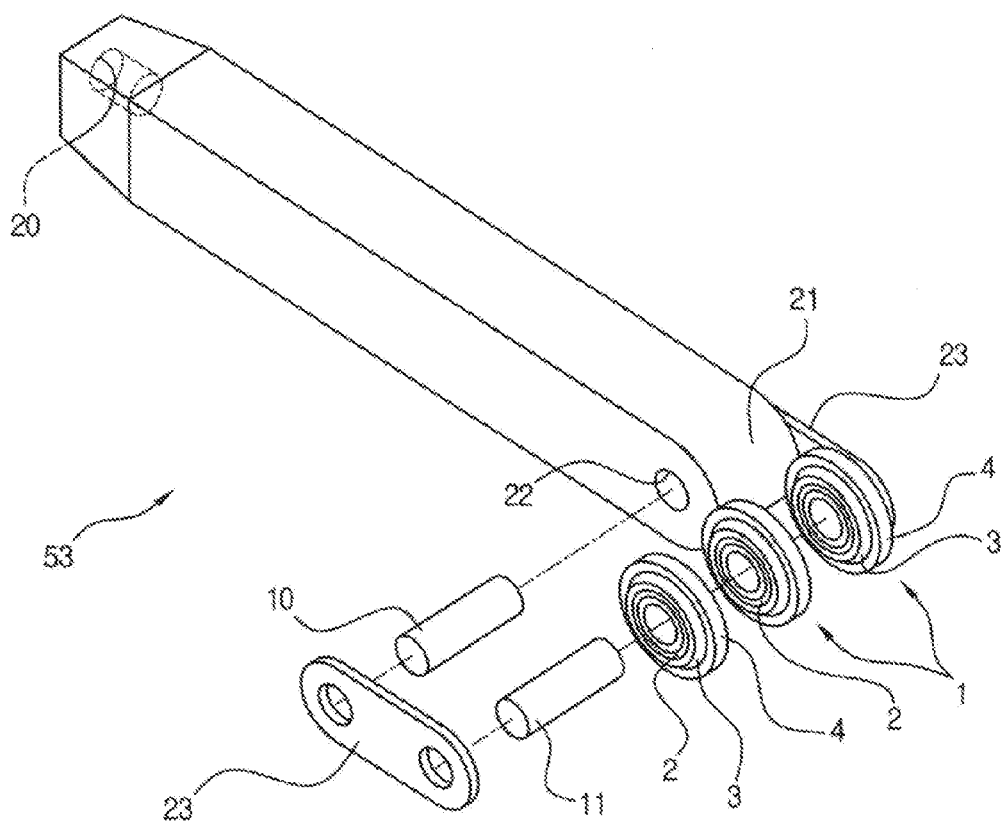
FIG. 2 is an exploded perspective view of the construction of major elements of the mandrel in accordance with the present invention.
Figure 3:
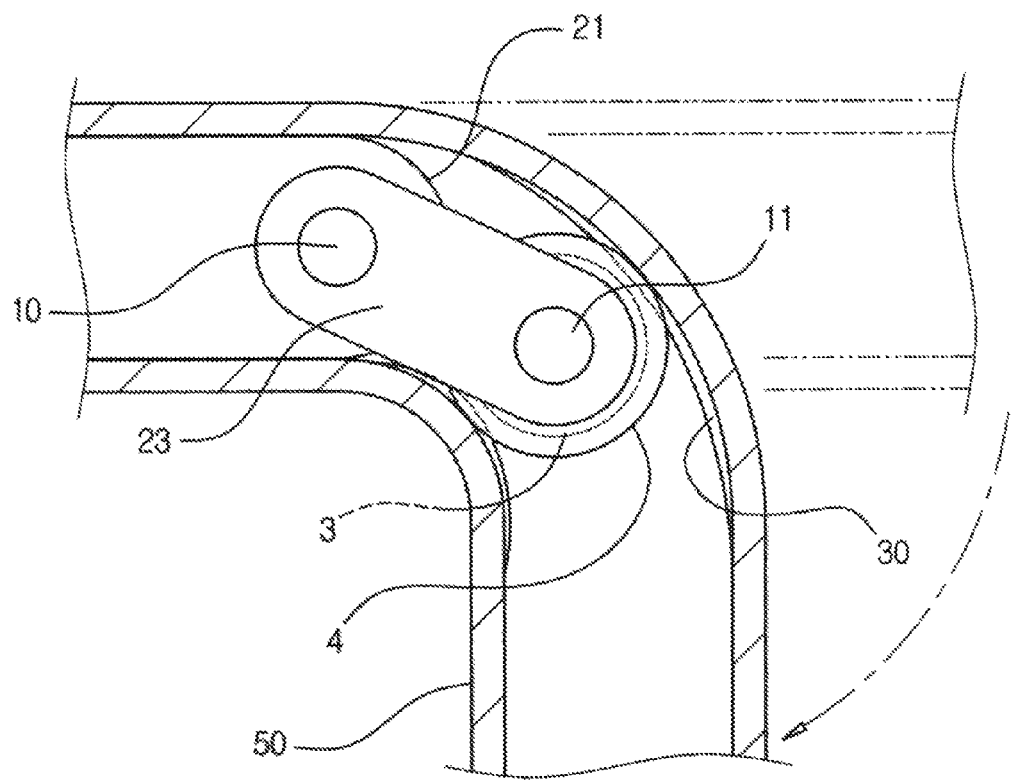
FIG. 3 is a cross-sectional view showing the action of the mandrel in accordance with the present invention.
Figure 4:
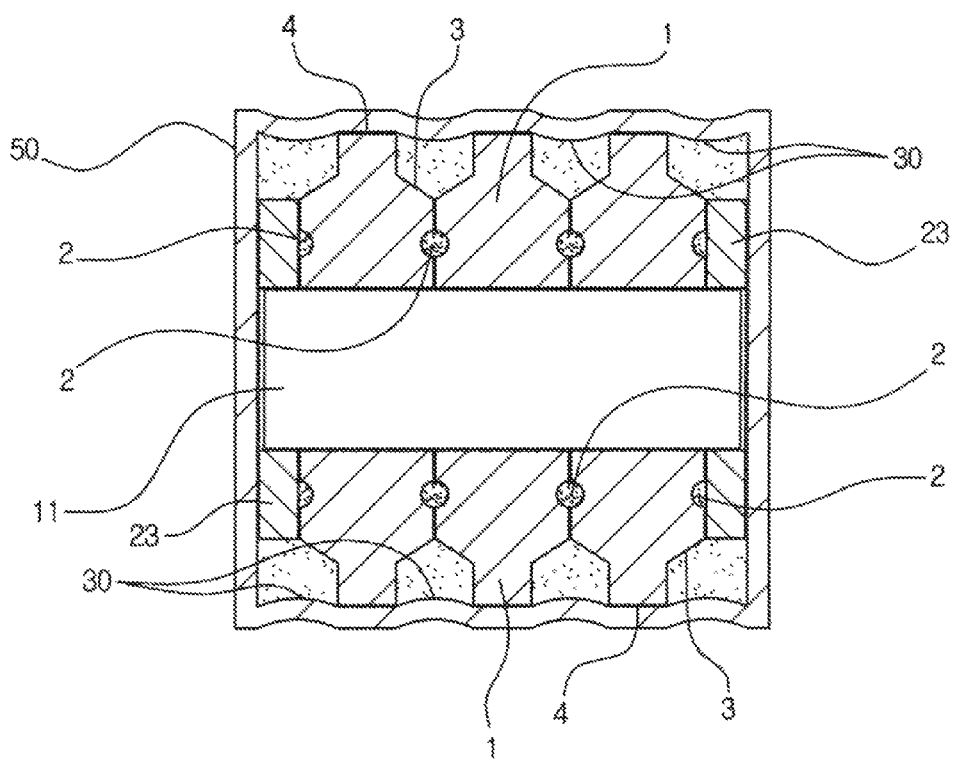
FIG. 4 is a cross-sectional view showing a state in which the mandrel has been depressed into a bent part by means of the mandrel.
Figure 5:
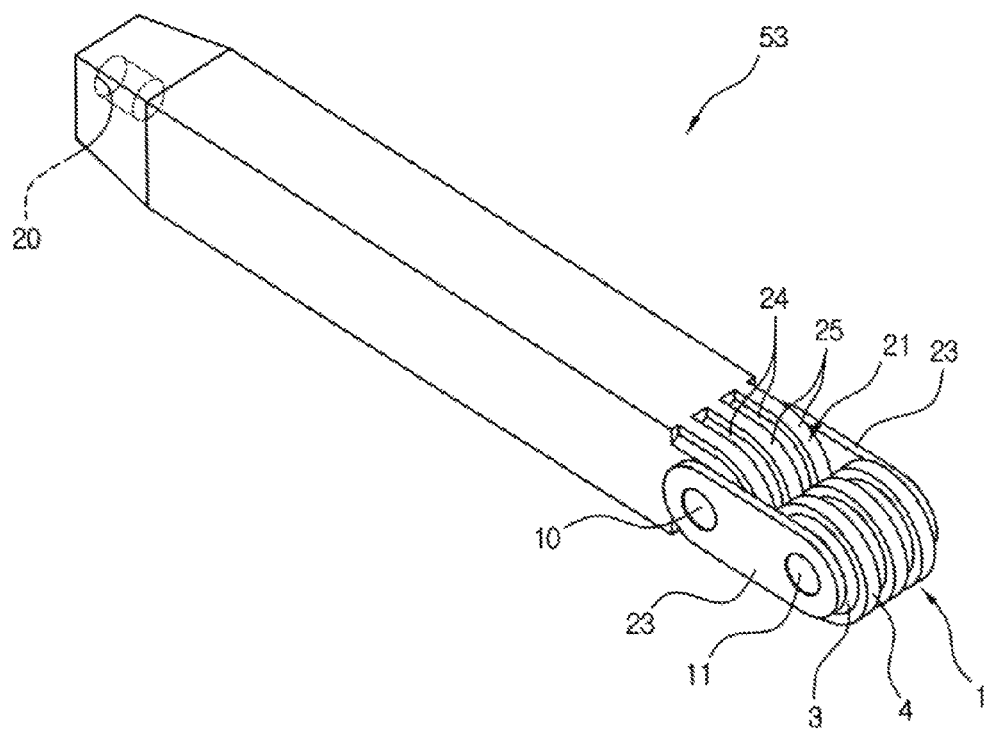
FIG. 5 is a perspective view showing another construction of the mandrel in accordance with the present invention.
Figure 6:
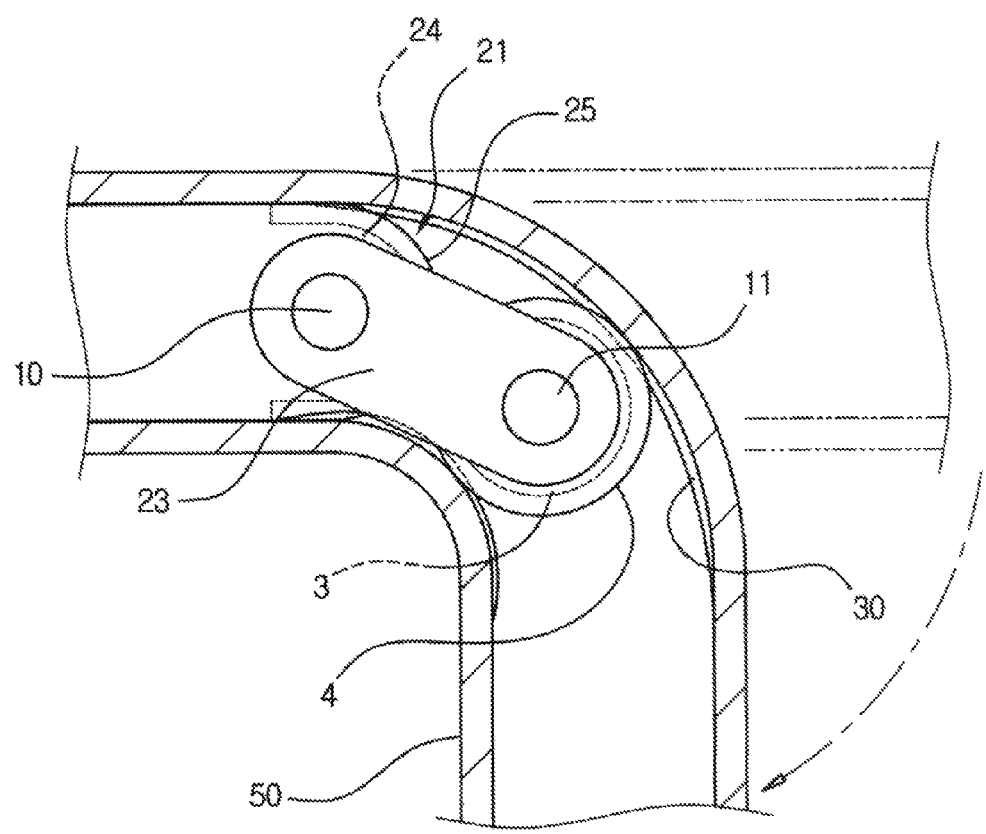
FIG. 6 is a cross-sectional view showing the action of another construction of the mandrel in accordance with the present invention.

Hereinafter, a mandrel for bending a rectangular duct body in accordance with some exemplary embodiments of the present invention is described in detail with reference to the accompanying drawings.

In a mandrel for bending a rectangular duct body in accordance with the present invention, a screw hole 20 for rod connection is formed at the rear end of a rectangular pole, and a round part 21 is formed at the front end of the rectangular duct body in order to avoid hindrance when the rectangular duct body is bent. A shaft pin hole 22 is formed to penetrate the side of the front end of the rectangular duct body so that connection pieces 23 are coupled to both sides of the front end of the rectangular duct body by means of a shaft pin 10.

Circular oil grooves 2 filled with lubricating oil are formed on both sides between the front ends of the connection pieces 23. Three rollers 1, each including depressed parts 3 and a protruded part 4, are closely adhered together by a shaft pin 11.

Two of the three rollers 1 are installed at positions close to the edge parts of the rectangular duct body on both side and one of the three rollers 1 is installed at the center between the two rollers in such a manner that the three rollers are individually rotated.

The protruded part 4 is configured at the center of the roller 1, and the depressed parts 3 are configured on both sides of the roller 1. The protruded part 4 has a size that is closely adhered to the inside of the rectangular duct body, and the depressed part 3 has a diameter smaller than that of the protruded part 4. Accordingly, when a bending work is performed, depression parts 3 are formed by the depressed parts 3.

In another construction of the mandrel of the present invention, depressed parts 24 and protruded part 25 are formed at positions on the same line as that of the depressed parts 3 and the protruded parts 4 of the roller 1 in a round part 21 formed at the front end of a rectangular pole. Accordingly, although the rectangular pole is sufficiently inserted into a bent part, the depression part 30 formed at the bent part is not damaged by means of the depressed parts 3 and the protruded parts 4 of the roller 1.

Reference numeral 50 is a rectangular duct body, 51 is a bending machine, 52 is a rod, and 53 is a mandrel.

The operation of the mandrel for bending a rectangular duct body configured as described according to the present invention is described in detail below.

The known bending machine 51 is used to bend the rectangular duct body 50 using the roller type mandrel 53 for bending a rectangular duct in accordance with the present invention. A description of the operation of the bending machine is omitted, and only the operation of the mandrel is described below.

First, the mandrel 53 is inserted into the rectangular duct body 50, and the rollers 1 forming the mandrel are placed at parts of the rectangular duct body that will be bent.

In such a state, when the rectangular duct body 50 is bent using the known bending machine 51, the rollers 1 that form the mandrel 53 are brought in contact with the bent parts of the inside of the rectangular duct body, thereby generating friction. Here, when the rollers 1 are rotated, lubricating oil (or grease) within the oil grooves 2 is drained, thereby minimizing the friction and abrasion of the rollers that are attributable to the friction between the bent parts of the rectangular duct body and the rollers. Furthermore, the grease within the oil grooves 2 is supplied to between the rollers and the connection pieces, between the rollers and the shaft pins, and between the rollers. Accordingly, the mandrel is smoothly driven due to the lubrication action.

In particular, since the rollers 1 forming the mandrel include the depressed parts 3 and the protruded parts 4, the depression parts 30 are formed in the bent parts of the rectangular duct body by means of the depressed parts 3. Accordingly, a crack can be prevented from occurring and the quality of a product can be improved because the roller serves as the muscle.

In the rollers 1 of the present invention, two rollers are formed at the edges of the rectangular duct body and one roller is additionally configured between the two rollers so that the three rollers are individually rotated. This is because frictional force applied to the rollers is different at edges, that is, the edge parts of the rectangular duct body, and at the central part of the rectangular duct body when a bending work is performed. In other words, this is because great force for plastic deformation is necessary for the ⌐ⵏ-shaped edge part of the rectangular duct body. Furthermore, the rollers need to be freely rotated and friction between the rollers needs to be reduced because the ─-shaped central part of the rectangular duct body can be easily subject to plastic deformation and the number of rotations of the rollers is different due to a difference between frictional force applied to the edge parts and frictional force applied to the central part of the roller.

Furthermore, since the rollers 1 are installed at the connection pieces 23, the rollers 1 are rotated around the shaft pin 11 and the connection pieces 23 are also moved on the basis of the shaft pins 10 and 11 at a specific angle. Furthermore, since the front end of the mandrel is rounded, although the width of an angle in which the rectangular duct body is bent is increased and the rectangular duct body is bent, the round part formed at the front end of the rectangular pole that forms the mandrel and two points by the rollers support the inside of the rectangular duct body.

Accordingly, although the mandrel is not densely moved, the bent part of the rectangular duct body can be prevented from being depressed because the bent part of the rectangular duct body is widely supported.

In accordance with the present invention, the front end of the rectangular pole that forms the mandrel is rounded, and grease within the oil grooves formed in the rollers performs a lubrication action. Accordingly, there is an advantage in that workability and productivity can be improved because frictional force between the rollers and between the inside of the rectangular duct body and the rollers is reduced when performing a bending work.

In particular, a conventional problem in which a crack is generated in a bent part can be solved because the depression parts are formed at the bent parts of the rectangular duct body at specific intervals. Furthermore, there is an advantage in that the quality of products used as various types of mechanical tools, such as a hanger arm connected to the trunk lead of a vehicle, can be improved because durability is enhanced by the depression parts.

What is claimed is:

1. A mandrel for bending a rectangular duct body, comprising:
   a rectangular pole having a round part formed at a front end of said rectangular pole; and
   first, second and third rollers sequentially aligned adjacent to said round part, wherein said round part and said first, second and third rollers are formed between first and second connection pieces, wherein a first shaft pin is installed to sequentially run through said first connection piece, said round part and said second connection piece, wherein a second shaft pin is installed to sequentially run through said first connection piece, said first, second and third rollers and said second connection piece, wherein said first, second and third rollers are individually rotatable,
   wherein when said first, second and third rollers are exposed to a friction resulting from a bending action within said rectangular duct body, circular oil grooves formed in sides of each of said first, second and third rollers and filled with lubricating oil serve to reduce said friction between said rectangular duct body and said first, second and third rollers, between said first, second and third rollers and said connection pieces, between said shaft pins and said first, second and third rollers, and between said first, second and third rollers themselves, and
   wherein a protruded part and a depressed part are formed along an outer periphery of said first, second and third rollers so that depression parts are formed inside said rectangular duct body when said bending action of said rectangular duct body is performed.

2. The mandrel of claim 1, wherein said depressed part and said protruded part serve to prevent damage to said depression parts of said rectangular duct body.

* * * * *